United States Patent [19]

Kondo et al.

[11] Patent Number: 5,017,713

[45] Date of Patent: May 21, 1991

[54] PROCESS FOR PREPARING SUBSTITUTED AMINOANTHRAQUINONES

[75] Inventors: Takanori Kondo, Hyogo; Hiroshi Yamachika, Osaka; Kunihiko Tanaka, Nara; Yasuhiro Nishida, Hyogo, all of Japan

[73] Assignees: Sumitomo Chemical Company, Ltd., Osaka; Daiei Chemical Company, Ltd., Hyogo, both of Japan

[21] Appl. No.: 433,784

[22] Filed: Nov. 8, 1989

[30] Foreign Application Priority Data

Nov. 10, 1988 [JP] Japan ................................ 63-285305
Nov. 10, 1988 [JP] Japan ................................ 63-285306

[51] Int. Cl.[5] ...................... C07C 97/24; C07C 50/24
[52] U.S. Cl. .................................. 552/237; 552/249; 552/251; 552/253; 552/254; 552/255; 552/256
[58] Field of Search ............... 552/253, 255, 260, 251, 552/249, 236, 254, 256, 237, 249

[56] References Cited

FOREIGN PATENT DOCUMENTS 1177869 1/1970 United Kingdom ................ 552/253

OTHER PUBLICATIONS

BIOS 1484 (PB Report 86139), pp. 1, 2, 18, 19, 46 and 69-73.
Chemical Abstract, 104 (5), Abstract No. 33914V.
Chemical Abstract, 91 (4), Abstract No. 22426Z.
Banchett, *Anthracene Anthraquinone*, 1921, p. 207.
Morrison & Boyd, Organic Chemistry, 3rd ed., 1974, p. 742.

*Primary Examiner*—Frederick E. Waddell
*Assistant Examiner*—Raymond Covington

*Attorney, Agent, or Firm*—Cushman, Darby & Cushman

[57] ABSTRACT

Substituted aminoanthraquinone compounds, which are used for dye stuffs or intermediate thereof, represented by the formula (II)

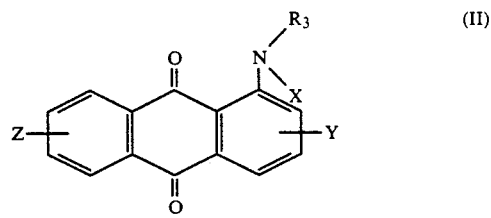

wherein $R_3$ represents a $C_1-C_6$ alkyl group which may be substituted, X represents a hydrogen atom, $-COR_1$ or $-SO_2R_2$ wherein $R_1$ and $R_2$ each represents a substituted or unsubstituted $C_1-C_4$ alkyl or $C_6-C_{12}$ aryl group, and Y and Z represent independently a hydrogen atom, a halogen atom, a nitro group or a $C_1-C_4$ alkyl group, is prepared by allowing anthraquinone compounds represented by the formula

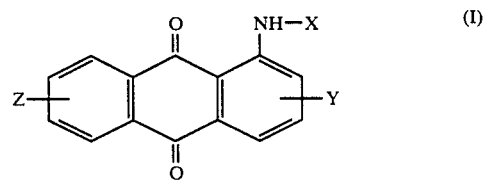

wherein X, Y and Z are as defined above, to react with alkylating agents in organic solvents in the presence of organic quaternary ammonium salts and alkalies.

6 Claims, No Drawings

PROCESS FOR PREPARING SUBSTITUTED AMINOANTHRAQUINONES

This invention relates to a new process for preparing substituted aminoanthraquinone derivatives which are useful as dyes, pigments and their intermediates, represented by the formula (II):

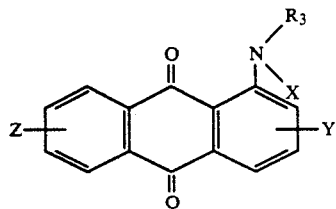

wherein $R_3$ represents a $C_1$-$C_6$ alkyl group which may be substituted, X represents a hydrogen atom, —$COR_1$ or —$SO_2R_2$ wherein $R_1$ and $R_2$ each is a substituted or unsubstituted $C_1$-$C_4$ alkyl or $C_6$-$C_{12}$ aryl group, and Y and Z represent independently a hydrogen atom, a halogen atom, a nitro group or a $C_1$-$C_4$ alkyl group.

Substituted aminoanthraquinone compounds represented by the formula (II), for example, compounds of the formula (II) wherein X is —$COR_1$ or —$SO_2R_2$ are conventionally produced by acylating or sulfonylating 1-alkyl-aminoanthraquinone compounds. This method has a problem in production of the starting material, 1-alkylaminoanthraquinone compounds. That is, 1-alkylaminoanthraquinone compounds are produced by allowing 1-anthraquinone sulfonic acid or salts thereof to react with alkyl amines. The production of 1-anthraquinone sulfonic acid requires the use of mercury as a catalyst and causes problems of environmental pollution. An approach to dissolve the problem is allowing 1-aminoanthraquinone to react with alkyl halides in sulfolane in the presence of alkalies to prepare 1-alkylaminoanthraquinone (JP 60-161951). This method, however, is not satisfactory yet in purity and yield and the use of sulfolane as solvents is troublesome.

After the present inventors extensively studied economical production of pure alkyl-substituted aminoanthraquinone compounds represented by the above mentioned formula (II) with high yield without any environmental pollution not through anthraquinone sulfonic acid, they succeeded in establishing the present invention.

According to the present invention, substituted aminoanthraquinone compounds of the formula (II):

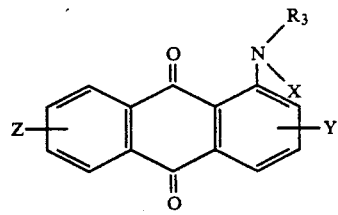

wherein $R_3$ represents a $C_1$-$C_6$ alkyl group which may be substituted, X represents a hydrogen atom, —$COR_1$ or —$SO_2R_2$ wherein $R_1$ and $R_3$ each is a substituted or unsubstituted $C_1$-$C_4$ alkyl or $C_6$-$C_{12}$ aryl group, and Y and Z represent independently a hydrogen atom, a halogen atom, a nitro group or a $C_1$-$C_4$ alkyl group, is prepared by allowing anthraquinone compounds represented by the formula (I):

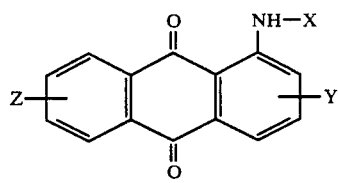

wherein X, Y and Z are as defined above, to react with alkylating agents in organic solvents in the presence of organic quaternary ammonium salts and alkalies.

One of the anthraquinone compounds represented by the formula (I) is 1-aminoanthraquinone compound. Derivatives of the compound are easily prepared by applying thereto acylation such as acetylation and/or sulfonylation, and/or halogenation, nitration or alkylation, etc. Anthraquinone compounds of the formula (I) are, for example,
1-aminoanthraquinone,
1-acetylaminoanthraquinone,
4-bromo-1-acetylaminoanthraquinone,
5-nitro-4-bromo-1-acetylaminoanthraquinone,
4-bromo-5-chloro-1-acetylaminoanthraquinone,
1-propyonylaminoanthraquinone,
1-benzoylaminoanthraquinone,
4-bromo-1-benzoylaminoanthraquinone,
1-cyanoacetylaminoanthraquinone,
1-chloroacetylaminoanthraquinone,
1-toluylaminoanthraquinone,
1-toluenesulfonylaminoanthraquinone,
4-bromo-1-p-toluenesulfonylaminoanthraquinone,
1-benzenesulfonylaminoanthraquinone,
1-methylsulfonylaminoanthraquinone and
1-naphthalenesulfonylaminoanthraquinone.

Organic solvents which may be used in the present invention are aromatic hydrocarbons, ketones, ethers, aliphatic hydrocarbons, halogenated aliphatic hydrocarbons or various polar solvents. They are, for example, aromatic hydrocarbons such as benzene, toluene, xylene, chlorobenzene, dichlorobenzene and nitrobenzene, ketones such as methyl ethyl ketone and methyl isobutyl ketone, ethers such as n-propyl ether and n-butyl ether, aliphatic hydrocarbons such as n-hexane, n-heptane and n-pentane, halogenated aliphatic hydrocarbons such as tetrachloroethane, trichloroethane and dichloromethane, dimethylformamide, dimethylacetamide, acetonitrile, tetrahydrofuran, dimethyl sulfoxide, sulfolane, dioxane and N-methylpyrrolidone. They may be used alone or in the form of mixtures.

Organic quaternary ammonium salts used in the present invention are, for example, tetra-n-propyl ammonium chloride, tetra-n-butyl ammonium chloride, tetraethyl ammonium chloride, benzyl triethyl ammonium chloride, dodecyl trimethyl ammonium chloride, trimethyl octyl ammonium chloride, dodecyl pyridinium chloride, tetrabutyl phosphonium chloride, lauryl picolinium chloride and the corresponding bromides, iodides, sulfates, perchlorates, phosphates, hydrogen sulfates, acetates, methyl sulfates and ethyl sulfates to these chlorides. These organic quaternary ammonium salts may be used alone or mixtures thereof. The ammonium salts may be added as they are to the reaction system or may be formed in situ. That is, tertiary ammonium salts, for example, triethylamine and chlorides, for example, benzyl chloride are added to the system to produce quaternary ammonium salts therein. The organic quaternary ammonium salts are used in an amount of 0.001–1.0 mol, preferably 0.01–0.1 mol per mol of the compounds represented by the formula (I).

Alkalies used in the present invention are, for example, caustic alkalies such as sodium hydroxide and potassium hydroxide and alkalies carbonates such as sodium carbonate and potassium carbonate. Preferable are caustic alkalies such as sodium hydroxide and potassium hydroxide. They are used in an amount of 1.0–5.0 mol, preferably 1.5–2.0 mol per mol of the compound of the formula (I).

Alkylating agents usable are, for example, alkyl halides, dialkylsulfuric acid and arylsulfonic acid alkyl ester. The alkyl halides are, for example, methyl iodide, ethyl iodide, n-propyl iodide, i-propyl iodide, n-butyl iodide, sec-butyl iodide, t-butyl iodide, n-amyl iodide, i-amyl iodide, n-hexyl iodide, acryl iodide, hydroxyethyl iodide, ethoxyethyl iodide, phenoxyethyl iodide, cyclohexyl iodide, and the corresponding chlorides and bromides to these iodides. Iodine or potassium iodide may be used as catalysts together when the halogen is chlorine or bromine. Dialkylsulfuric acids are, for example, dimethylsulfuric acid and diethylsulfuric acid. Arylsulfonic acid alkyl esters include methyl p-toluenesulfonate, ethyl p-toluenesulfonate, methyl benzenesulfonate and ethyl benzenesulfonate. The alkylating agents are used in an amount of 1.0–5.0 mol, preferably 1.5–2.0 mol per mol of the compounds of the formula (I).

The alkylation is carried out under atmospheric pressure or under pressure at a temperature of 0°–150° C., preferably 20°–100° C.

Substituted aminoanthraquinone compounds thus produced are obtained in such a manner that the reaction mixture is distilled to remove the organic solvents and crystals precipitated are filtered.

One of preferable embodiments of the present invention is that 1-acetylaminoanthraquinone obtained from a reaction of 1-aminoanthraquinone with acetylating agents, or brominated compound thereof is alkylated in accordance with the present invention to produce the desired substituted aminoanthraquinone. That is, 1-aminoanthraquinone is allowed to react with acetylating agents to obtain 1-acetylaminoanthraquinone, which is then allowed to react, for example, with methylating agents to cause N-methylation and to produce N-acetyl-1-methylaminoanthraquinone. The resultant compound, if necessary, is further allowed to react with brominating agents to produce 4-bromo-N-acetyl-1-methylaminoanthraquinone. Alternatively, 1-aminoanthraquinone is allowed to react with acetylating agents to obtain 1-acetylaminoanthraquinone and the resultant compound is then allowed to react with brominating agents to produce 4-bromo-1-acetylaminoanthraquinone which is further allowed to react with methylating agents to obtain 4-bromo-N-acetyl-1-methylaminoanthraquinone. The respective steps are explained in detail hereinunder. The reaction conditions given below do not in any way restrict the present invention.

To begin with, 1-aminoanthraquinone (hereinafter referred to as 1-AAQ) is acetylated to produce 1-acetylaminoanthraquinone (hereinafter referred to as ACQ). This step is conducted preferably with acetylating agents in organic solvents. The organic solvents usable are aliphatic carboxylic acids, aromatic hydrocarbons, ketones, ethers, aliphatic hydrocarbons, halogenated aliphatic hydrocarbons, etc. Examples are aliphatic carboxylic acids such as acetic acid and propionic acid, aromatic hydrocarbons such as benzene, toluene, xylene, chlorobenzene, dichlorobenzene and nitrobenzene, ketones such as methyl ethyl ketone and methyl isobutyl ketone, ethers such as n-propyl ether and n-butyl ether, aliphatic hydrocarbons such as n-hexane, n-heptane and n-pentane and halogenated aliphatic hydrocarbons such as tetrachloroethane, trichloroethane and dichloromethane. The acetylating agents usable are those familiar to the skilled. Examples are acetic anhydride and acetyl halides. The reaction is conducted usually at a temperature between room temperature and 150° C., though it varies depending on reagents. For example, if acetic acid is used as a solvent and acetic anhydride as an acetylating agent, the acetic anhydride is used in an amount of 1.0–2.0 times in mol, preferably 1.1–1.2 times in mol as much as 1-AAQ, and reaction temperature is 60°–150° C., preferably 90°–120° C.

Production of 4-bromo-1-acetylaminoanthraquinone (hereinafter referred to as Br-ACQ) by brominating ACQ is effected in a usual manner. For instance, ACQ is allowed to react with brominating agents, in inert organic solvents and/or water, if necessary together with oxydizing agents. That is, ACQ is dissolved and/or dispersed in inert organic solvents and/or water (2–10 times by weight as much as ACQ) is allowed to react with brominating agents in the presence of oxydizing agents. The organic solvents usable are the same as those used for the above mentioned acetylation, but they are required to be inert to the bromination. Besides, the use of a mixed solvent of water and the above mentioned organic solvents is preferred, since the presence of water is preferable in the bromination. When water is used as the solvent, ACQ is dispersed in water and is allowed to react with sodium chlorate or sodium bromate, an oxidizing agent, (0.1–1.0 times in mol, preferably 0.2–0.7 times in mol as much as ACQ) together with bromine or hydrobromic acid, a brominating agent (1.0–5.0 times in mol, preferably 1.0–3.0 times in mol as much as ACQ) at a temperature of 10°–100° C., preferably 20°–60° C.

N-methylation of Br-ACQ with an aid of methylating agents in accordance with the present process gives the desired 4-bromo-N-acetyl-1-methylaminoanthraquinone (hereinafter referred to as Br-QAM).

Alternatively, a step wherein ACQ is N-methylated and then brominated to produce Br-QAM is conducted in the same manner as mentioned in the methylation and bromination above. That is, ACQ is allowed to react with methylating agents in organic solvents in the presence of organic quaternary ammonium salts and alkalis to obtain N-acetyl-1-methylaminoanthraquinone (hereinafter referred to as QAM). QAM is easily changed to 1-methylaminoanthraquinone by a conventional hydrolysis by use of mineral acids, for example, sulfuric acid or hydrochloric acid. QAM thus obtained is brominated in the same manner as mentioned above until Br-QAM is easily obtained. Br-QAM obtained by the method of the present invention is taken out by removing unaltered bromine after completion of the reaction, and if necessary, distilling off the organic solvents, etc., and then filtering crystals precipitated.

A more economical process is that may be continuously conducted. That is, a product in each step is not taken out after each step is over but a product obtained in a step is fed to the next step. This is possible by the use of the same solvent throughout the series of reactions.

Br-QAM which is one of the compounds to be obtained by the present invention is hydrolyzed in a manner familiar to the skilled with, for instance, such mineral acids as sulfuric acid or hydrochloric acid, until 4-bromo-1-methylaminoanthraquinone is produced.

As explained above, the present invention provides substituted aminoanthraquinone compounds of the above-mentioned formula (II) with high purity and high yield, not through anthraquinonesulfonic acid. The resultant anthraquinone compounds of the formula (II) are useful as dyestuffs, pigments or intermediates thereof, particularly as intermediates of anthrapyridone compounds.

According to one of the favorable modes of practice of the present invention, 4- bromo-N-acetyl-1-methylaminoanthraquinone (Br-QAM), one of the desired compounds, is easily produced economically with high purity and high yield by first acetylating the starting material, 1-aminoanthraquinone (1-AAQ), which is obtainable at a relatively low cost, and then brominating and methylating at random. The resultant Br-QAM may be used without further purification as a starting material for the following steps.

EXAMPLE 1

A mixture of 1-aminoanthraquinone (purity 99.6%, 22.4 g), nitrobenzene (224 g), 96% potassium hydroxide (11.7 g), tetra-n-butyl ammonium bromide (1.7 g) and dimethylsulfuric acid (25 g) was stirred, while being maintained at 30° C. for 24 hours. Then, after water (150 g) was added, the solution was stirred for one hour while being maintained at 50° C. The aqueous phase had pH of 10 or higher. After acetic acid (0.5 g) was added for neutralization until pH of the aqueous phase was 7, nitrobenzene was recovered. The solution was cooled down to 50° C., and filtered. The solid material was washed and dried, to obtain 1-methylaminoanthraquinone (23.7 g, purity: 99.5%, yield 99.5%).

EXAMPLE 2

A mixture of 1-aminoanthraquinone (purity 99.6%, 22.4 g), monochlorobenzene (224 g), tetra-n-butyl ammonium bromide (3.4 g), 96% potassium hydroxide (11.7 g) and dimethylsulfuric acid (25 g) was stirred while being maintained at 30° C. for 24 hours. After water (150 g) was added, the solution was stirred for 1 hour, being maintained at 50° C. pH of the aqueous phase was 10 or higher. Then, acetic acid (0.5 g) was added for neutralization (pH of the aqueous phase being 7) and then monochlorobenzene was recovered by heating. After being cooled down to 50° C., the solution was filtered, and a solid was washed and then dried to obtain 1-methylaminoanthraquinone (23.7 g, purity 97.6%, yield 97.6%).

COMPARATIVE EXAMPLE 1

Example 1 was repeated except that no organic quaternary ammonium salt was used. The reaction proceeded slowly, leaving a large amount of unaltered materials. The resultant dried cake (24.5 g) contained 70.6% of 1-methylaminoanthraquinone (yield 73.0%).

EXAMPLE 3

A mixture of 4-bromo-1-acetylaminoanthraquinone (purity 98%, 35.1 g), monochlorobenzene (420 g), tetra-n-butyl ammonium bromide (0.3 g) and 96% potassium hydroxide (12.0 g) was stirred for one hour while being maintained at 30° C. Dimethylsulfuric acid (25.2 g) was dropped at 30° C. over 2 hours. The mixture was stirred at 30° C. for 30 minutes, 40° C. for 2 hours and 50° C. for 4 hours, successively. After water (200 g) was added, the solution was stirred for 1 hour while being maintained at 50° C. pH of the aqueous phase was 10 or higher. After acetic acid (0.5 g) was added for neutralization (pH of the aqueous phase being 7), monochlorobenzene was recovered by heating. After being cooled down to 50° C., the solution was filtered. A solid material was washed and dried to obtain 4-bromo-N-acetyl-1-methylaminoanthraquinone (35.0 g, purity 94.0%, yield 91.9%).

EXAMPLE 4

A mixture of 1-acetylaminoanthraquinone (purity 99.9%, 26.5 g), monochlorobenzene (320 g), tetra-n-butyl ammonium bromide (0.3 g) and 96% potassium hydroxide (12.0 g) was stirred for 30 minutes while being maintained at 50° C. Then, dimethylsulfuric acid (25.2 g) was dropped at 50° C. over 2 hours. The solution was stirred at 50° C. for 30 minutes, 60° C. for 2 hours and 70° C. for 4 hours, successively. After water (150 g) was added, the solution was stirred for 1 hour while being maintained at 50° C. Then, the same procedure as in Example 3 was carried out to obtain N-acetyl-1-methylaminoanthraquinone (27.9 g, purity 93.6%, yield 93.6%).

EXAMPLE 5

A mixture of 1-acetylaminoanthraquinone (purity 99.9%, 26.5 g), xylene (500 g), tetra-n-butyl ammonium chloride (0.6 g) and 96% potassium hydroxide (12.0 g) was stirred for 1 hour while being maintained at 50° C. Then, dimethylsulfuric acid (25.2 g) was dropped at 50° C. over 2 hours. The mixture was stirred at 50° C. for 30 minutes, 60° C. for 2 hours and 70° C. for 4 hours, successively. After water (250 g) was added, the solution was stirred for 1 hour, while being maintained at 50° C. Then, the same procedure as in Example 3 was applied to obtain, after xylene was recovered, N-acetyl-1-methylaminoanthraquinone (27.7 g, purity 92.4%, yield 91.7%).

EXAMPLE 6

A mixture of 4-bromo-1-acetylaminoanthraquinone (purity 98%, 35.1 g), methyl isobutyl ketone (500 g), tetra-n-butyl ammonium bromide (0.3 g) and 96% potassium hydroxide (12.0 g) was stirred for 1 hour while being maintained at 30° C. Dimethylsulfuric acid (25.2 g) was dropped at 30° C. over 2 hours. The mixture was stirred at 30° C. for 1 hour, 40° C. for 2 hours and 50° C. for 4 hours, successively. After water (250 g) was added, the solution was stirred for 1 hour, while being maintained at 50° C. Then, the same procedure as in Example 3 was applied to obtain, after methyl isobutyl ketone was recovered, 4-bromo-N-acetyl-1-methylaminoanthraquinone (34.8 g, purity 93.6%, yield 91.0%).

EXAMPLE 7

A mixture of 4-bromo-1-acetylaminoanthraquinone (purity 98%, 35.1 g), monochlorobenzene (420 g), tetra-n-butyl ammonium bromide (0.3 g) and 96% potassium hydroxide (12.0 g) was stirred for 1 hour, while being maintained at 30° C. Then, methyl iodide (28.4 g) was dropped at 30° C. over 2 hours. The mixture was stirred at 30° C. for 30 minutes and 40° C. for 3 hours, successively. Then the same procedure as in Example 3 was applied to obtain 4-bromo-N-acetyl-1-methylaminoanthraquinone (35.1 g, purity 94.4%, yield 92.6%).

EXAMPLE 8

A mixture of 4-bromo-1-acetylaminoanthraquinone (purity 98%, 35.1 g), monochlorobenzene (420 g), tetra-n-butyl ammonium bromide (0.3 g), 96% potassium hydroxide (12.0 g) and potassium iodide (0.5 g) was stirred for 1 hour in an autoclave, while being maintained at 30° C. Then, methyl chloride (10.2 g) was added. The mixture was stirred at 50° C. for 2 hours and 70° C. for 10 hours, successively. After the temperature was lowered to 30° C. and pressure was released, the solution was transferred to a flask by adding water (200 g), and then acetic acid (1.2 g) was added thereto. The aqueous phase had pH of 7. After monochlorobenzene was recovered by heating, the solution was cooled down to 50° C. and filtered. The solid material was washed and dried to obtain 4-bromo-N-acetyl-1-methylaminoanthraquinone (34.7 g, purity 92.9%, yield 90.0%).

EXAMPLES 9-14

Example 4s were repeated except that equivalent mol amounts of organic quaternary ammonium salts shown in Table 1 were used in place of the organic quaternary ammonium salt, tetra-n-butyl ammonium bromide. The results are shown in Table 1.

TABLE 1

| Example No. | Organic quaternary ammonium salt | Quantity obtained (g) | Purity (%) | Yield (%) |
|---|---|---|---|---|
| 9 | Tetra-n-propyl ammonium bromide | 27.9 | 92.1 | 92.1 |
| 10 | Tetra-n-butyl ammonium chloride | 27.8 | 93.1 | 92.7 |
| 11 | Tetra-n-butyl ammonium iodide | 27.7 | 93.0 | 92.3 |
| 12 | Benzyl triethyl ammonium chloride | 27.6 | 92.2 | 91.2 |
| 13 | Dodecyl trimethyl ammonium bromide | 27.6 | 92.0 | 91.0 |
| 14 | Benzyl tri-n-propyl ammonium chloride | 27.8 | 92.6 | 92.3 |

COMPARATIVE EXAMPLE 2

Example 4 was repeated except that the organic quaternary ammonium salt was not used. The reaction was slow and a large amount of unaltered materials was left. Dried cake (27.0 g) contained 41.6% of N-acetyl-1-methylaminoanthraquinone. Yield: 40.3%.

COMPARATIVE EXAMPLE 3

Example 3 was repeated except that the organic quaternary ammonium salt was not used. The reaction was slow and interrupted on its way, leaving a large amount of unaltered materials. Dried cake (35.4 g) contained 30.2% of 4-bromo-N-acetyl-1-methylaminoanthraquinone. Yield: 29.9%.

EXAMPLE 15

A mixture of 4-bromo-1-acetylaminoanthraquinone (purity 98%, 35.1 g), monochlorobenzene (420 g), tetra-n-butyl ammonium bromide (0.3 g) and 98.5% sodium hydroxide (8.1 g) was stirred for 1 hour, while being maintained at 30° C. Then, dimethylsulfuric acid (25.2 g) was dropped at 30° C. over 2 hours. The mixture was stirred at 30° C. for 30 minutes, 40° C. for 2 hours and 50° C. for 4 hours, successively. Then, the same after treatment as in Example 3 was conducted to obtain 4-bromo-N-acetyl-1-methylaminoanthraquinone (34.9 g, purity 93.7%, yield 91.3%).

EXAMPLES 16-19

Example 7s were repeated except that, equivalent mole amounts of alkyl iodide shown in Table 2 were used in place of the methyl iodide to obtain the corresponding 4-bromo-N-acetyl-1-alkylaminoanthraquinones, respectively.

TABLE 2

| Example No. | alkyl halides | Amount obtained (g) | Purity (%) | Yield (%) |
|---|---|---|---|---|
| 16 | $C_2H_5I$ | 37.2 | 93.5 | 93.5 |
| 17 | $CH_2=CHCH_2I$ | 38.0 | 91.2 | 90.1 |
| 18 | $HOC_2H_4I$ | 38.5 | 90.2 | 89.5 |
| 19 | $C_6H_5-CH_2CH_2I$ | 44.8 | 90.4 | 90.3 |

EXAMPLE 20

Example 4 was repeated except that methyl p-toluenesulfonate (33.5 g) was used in place of the dimethylsulfuric acid to obtain N-acetyl-1-methylaminoanthraquinone (27.6 g, purity 92.3%, yield 91.3%).

EXAMPLE 21

A mixture of 5-nitro-4-bromo-1-acetylaminoanthraquinone (purity 98%, 38.7 g), monochlorobenzene (460 g), tetra-n-butyl ammonium bromide (0.3 g) and 96% potassium hydroxide (12.0 g) was stirred for 1 hour at 30° C., and then methyl iodide (28.4 g) was added at 30° C. over 2 hours. The same after-treatment as in Example 3 was conducted to obtain 5-nitro-4-bromo-N-acetyl-1-methylaminoanthraquinone (39.3 g, purity 92.3%, yield 92.3%).

EXAMPLE 22

A mixture of 4-bromo-1-p-toluenesulfonylaminoanthraquinone (purity 98%, 46.5 g), monochlorobenzene (550 g), tetra-n-butyl ammonium bromide (0.3 g) and 96% potassium hydroxide (12.0 g) was stirred for 1 hour at 30° C. and methyl iodide (28.4 g) was added thereto at 30° C. over 2 hours. A mixture was stirred at 30° C. for 30 minutes and 40° C. for 3 hours, successively. Then, the same aftertreatment as in Example 3 was effected to obtain 4-bromo-N-p-toluenesulfonyl-1-methylaminoanthraquinone (46.9 g, purity 92.5%, yield 92.3%).

EXAMPLE 23

A mixture of 4-bromo-1-benzoylaminoanthraquinone (purity 98.5%, 41.2 g), monochlorobenzene (500 g), tetra-n-butyl ammonium bromide (0.3 g) and 96% potassium hydroxide (12.0 g) was stirred for one hour at 30° C., and methyl iodide (28.4 g) was added thereto at 30° C. over 2 hours. A mixture was stirred at 30° C. for 30 minutes and 40° C. for 3 hours, successively. Then, the same aftertreatment as in Example 3 was conducted to obtain 4-bromo-N-benzoyl-1-methylaminoanthraquinone (41.8 g, purity 94.5%, yield 94.0%).

EXAMPLE 24

To a mixture of 4-bromo-5-chloro-1-acetylaminoanthraquinone (purity 98%, 38.6 g), monochlorobenzene (460 g), tetra-n-butyl ammonium bromide (0.3 g) and 96% potassium hydroxide (12.0 g) was added methyl iodide (28.4 g) at 30° C. over 2 hours. A mixture was stirred at 30° C. for 30 minutes and 40° C. for 3 hours, successively. Then, the same after-treatment as in Example 3 was carried out to obtain 4-bromo-5-chloro-N-acetyl-1-methylaminoanthraquinone (39.3 g, purity 93.7%, yield 93.8%).

EXAMPLE 25

Synthesis of ACQ from 1-AAQ

A mixture of 1-AAQ (purity 98.9%, 364 g), acetic acid (3,640 g) and acetic anhydride (179.5 g) was heated to 100° C. under stirring and a reaction was allowed to proceed for 2 hours. After the reaction was over, the solution was cooled down to 30° C. and filtered, and a solid was washed and dried to obtain ACQ (424 g, purity 99.9%, yield 99.9%).

Synthesis of Br-ACQ from ACQ

To a mixture of ACQ (purity 99.9%, 398 g), sodium bromate (45 g) and water (2,400 g) was added bromine (345 g) under stirring at 30° C. over 3 hours. A reaction was conducted at 30° C. for 10 hours. After the reaction was over, 35% sodium bisulfite was added to remove excess bromine, followed by filtration, washing and drying to obtain Br-ACQ (517.5 g, purity 98.5%, yield 98.8%).

Synthesis of Br-QAM from Br-ACQ

A mixture of Br-ACQ (purity 98.5%, 34.9 g), monochlorobenzene (420 g), tetra-n-butyl ammonium bromide (1.6 g) and 96% potassium hydroxide (11.7 g) was hold at 30° C. for 30 minutes under stirring. Dimethylsulfuric acid (25.2 g) was dropped at 30° C. over 2 hours. A reaction was carried out at 40° C. for 2 hours and at 60° C. for 3 hours. After the reaction was over, water (200 g) was added at 50° C. The pH of the aqueous phase was 10 or higher. After the solution was stirred at 50° C. for 1 hour, acetic acid (0.5 g) was added to neutralize to pH of 7. Then, monochlorobenzene was recovered by steam distillation. After being cooled down to 50° C., the solution was filtered, and a solid was washed and dried to obtain Br-QAM (35.2 g, purity 94.2%, yield 92.6%). An overall yield from 1-AAQ was 91.4%. Br-QAM thus obtained (purity 94.2% 19.0 g) was added to 70% sulfuric acid (148.2 g). The solution was heated to 80° C. under stirring and a reaction was allowed to proceed at 80° C. for 3 hours. Then, after the solution was cooled down to 50° C., water (111 g) was dropped to precipitate crystals. The solution was cooled down to 30° C., followed by filtration, washing and drying to obtain 4-bromo-1-methylaminoanthraquinone (15.8 g, purity 95.5%, yield 95.5%).

COMPARATIVE EXAMPLE 4

Example 25 was repeated except that the Br-ACQ obtained therein was allowed to react without the organic quaternary ammonium. The reaction was slow and there was left a large amount of Br-ACQ unaltered. Then, a reaction was further conducted at 60° C. for 10 hours to obtain dried cake (35.5 g) containing 30.4% of Br-QAM. Yield: 30.1%.

EXAMPLE 26

A mixture of Br-ACQ (34.9 g) obtained by the method of Example 25, methyl isobutyl ketone (500 g), tetra-n-butyl ammonium bromide (1.6 g) and 98.5% sodium hydroxide (8.1 g) was maintained at 30° C. for 30 minutes under stirring, and then dimethylsulfuric acid (25.2 g) was added at 30°–40° C. over 2 hours. A reaction was conducted at 40° C. for 2 hours and 60° C. for 4 hours. After the reaction was over, water (250 g) was added at 40° C. The aqueous phase had pH of 10 or higher. After the solution temperature was maintained at 50° C. for one hour, acetic acid (0.5 g) was added to neutralize the aqueous phase down to pH 7. Then, methyl iso-butyl ketone was recovered by steam distillation. Subsequently, the solution was cooled down to 50° C., followed by filtration, washing with water and drying to obtain Br-QAM (34.7 g, purity 93.4%, yield 90.5%).

EXAMPLE 27

A mixture of Br-ACQ (34.9 g) obtained by the method of Example 25, monochlorobenzene (420 g), tetra-n-butyl ammonium bromide (1.6 g) and 96% potassium hydroxide (11.7 g) was hold at 30° C. for 1 hour under stirring. Methyl iodide (28.4 g) was added thereto at 28°–30° C. over one hour. A reaction was allowed to proceed further at 30° C. for 30 minutes and 40° C. for 3 hours. After the reaction was over, water (200 g) was added at 40° C. The aqueous phase had pH of 10 or higher. After acetic acid (0.5 g) was added, steam distillation was conducted to recover the monochlorobenzene. Then, the solution was cooled down to 50° C., followed by filtration, washing and drying to obtain Br-QAM (35.1 g, purity 94.4%, yield 92.6%).

EXAMPLES 28–34

Example 25s were repeated to obtain Br-QAM using the Br-ACQ obtained therein, except that equivalent mol amounts of the organic quaternary ammonium salts shown in the following Table 3 were used in place of the tetra-n-butyl ammonium bromide. The results are given in Table 3.

TABLE 3

| Example No. | Organic quaternary ammonium salt | Amount Obtained (g) | Purity (%) | Yield (%) |
|---|---|---|---|---|
| 28 | Tetra-n-propyl ammonium bromide | 35.1 | 93.1 | 91.3 |
| 29 | Tetra-n-propyl ammonium chloride | 35.0 | 92.5 | 90.4 |
| 30 | Tetra-n-butyl ammonium chloride | 35.2 | 93.6 | 92.0 |
| 31 | Dodecyl trimethyl ammonium bromide | 35.1 | 92.8 | 91.0 |
| 32 | Tetra-n-butyl ammonium iodide | 35.0 | 92.1 | 90.0 |
| 33 | Benzyl tripropyl ammonium chloride | 35.1 | 93.2 | 91.4 |
| 34 | Dodecyl trimethyl ammonium chloride | 35.0 | 92.3 | 90.2 |

EXAMPLE 35

A mixture of Br-ACQ (34.9 g) obtained by the method of Example 25, monochlorobenzene (420 g), tetra-n-butyl ammonium bromide (1.6 g), 96% potassium hydroxide (12.3 g) and potassium iodide (0.5 g) charged into an autoclave was maintained, under stirring, at 30° C. for 1 hour, and then methyl chloride (10.2 g) was charged. A reaction was allowed to proceed at 50° C. for 2 hours and at 70° C. for 10 hours. After the reaction was over, the solution was cooled down to 30° C. and pressure was released. Then, the solution was poured into a flask by adding water (200 g) and then acetic acid (1.2 g) was added thereto. pH of the aqueous phase was 7. Monochlorobenzene was recovered by steam distillation. The solution was cooled down to 50° C., followed by filtration, washing and drying to obtain Br-QAM (34.7 g, purity 92.9%, yield 90.0%).

EXAMPLE 36

A mixture of Br-ACQ (purity 98.5%, 34.9 g) obtained by the method of Example 25, monochlorobenzene (420 g), tetra-n-butyl ammonium bromide (1.6 g) and 96% potassium hydroxide (12.0 g) was maintained at 30° C. for 1 hour under stirring, and then methyl p-toluenesulfonate (33.5 g) was added thereto at 30°–40° C. over 2 hours. A reaction was allowed to proceed at 40° C. for 2 hours and 60° C. for 3 hours. After the reaction was over, water (200 g) was added at 50° C. The pH of the aqueous phase was 10 or high. After the solution was stirred at 50° C. for one hour, acetic acid (0.2 g) was added to neutralize the solution to pH 7. Subsequently, the monochlorobenzene was recovered by steam distillation. The solution was then cooled down to 50° C., followed by filtration, washing and drying to obtain Br-QAM (35.6 g, purity 93.1%, yield 92.6%).

EXAMPLE 37

Synthesis of QAM from ACQ

A mixture of ACQ (purity 99.9%, 26.5 g) obtained by the method of Example 25, monochlorobenzene (320 g), tetra-n-butyl ammonium bromide (0.3 g) and 96% potassium hydroxide (12.0 g) was hold at 50° C. for 30 minutes under stirring. Dimethylsulfuric acid (25.2 g) was added thereto at 50° C. over 2 hours. A solution was stirred at 50° C. for 30 minutes, 60° C. for 2 hours and 70° C. for 4 hours, successively. After water (150 g) was added, the solution was stirred at 50° C. for 1 hour. The pH of the aqueous phase was 10 or higher. Then, acetic acid (0.5 g) was added to neutralize the solution until pH of the aqueous phase reached 7, and then the monochlorobenzene was recovered by heating. After the solution was cooled down to 50° C., it was filtered and a solid was washed and dried to obtain N-acetyl-1-methylaminoanthraquinone (QAM 27.9 g, purity 93.6%, yield 93.6%).

Synthesis of Br-QAM from QAM

To a mixture of QAM (purity 93.6%, 27.9 g), water (500 g) and sodium bromate (7.0 g) was added bromine (104.7 g) at 25°–30° C. over 3 hours, and a reaction was allowed to proceed at 30° C. for 10 hours. After the reaction was over, 35% sodium bisulfite was added to remove excess bromine, followed by filtration, washing and drying to obtain 4-bromo-N-acetyl-1-methylaminoanthraquinone (Br-QAM 33.5 g, purity 87.5%, yield 87.5%). An overall yield from 1-AAQ: 81.8%.

EXAMPLE 38

Synthesis of Br-QAM from 1-AAQ

A mixture of 1-aminoanthraquinone (1-AAQ, purity 98.8%, 22.6 g), nitrobenzene (182.4 g) and acetic anhydride (11.7 g) was heated to 110° C. under stirring and a reaction was allowed to proceed at the same temperature for 5 hours. After the reaction was over, the solution was cooled down to 50° C. and water (100 g) was added thereto. 20% Aqueous caustic soda solution were added to neutralize the aqueous phase to pH 7. The solution was left to stand and the aqueous supernatant layer was separated to obtain ACQ slurry in nitrobenzene (210 g).

This slurry solution was used as it was for the subsequent step, but distillation of the slurry to remove the solvent gave ACQ (26.5 g, purity 99.8%, yield 99.8%).

To the ACQ slurry in nitrobenzene were added water (100 g) and sodium bromate (3 g). To the solution was added bromine (19.2 g) under stirring at 25°14 30° C. over 3 hours. A reaction was allowed to proceed at 30° C. for 20 hours. After the reaction was over, 35% sodium bisulfite was added to remove excess bromine. Further, water (100 g) and 20% aqueous caustic soda solution were added to neutralize the aqueous phase to pH 7. After the solution was left to stand, a supernatant aqueous phase was separated. The residue was heated under reduced pressure to effect azeotropic distillation of water contained in Br-ACQ slurry in nitrobenzene by aid of the nitrobenzene, to obtain Br-ACQ slurry in nitrobenzene (213 g).

This slurry may be used as it was for the subsequent step, but distillation to remove the solvent gave Br-ACQ (34.5 g, purity 94.5%). An overall yield from 1-AAQ: 94.8%.

To the slurry in nitrobenzene were added tetra-n-butyl ammonium bromide (1.6 g) and 96% potassium hydroxide (11.7 g) at 30° C. After the solution was stirred at 30° C. for 30 minutes, dimethylsulfuric acid (25.2 g) was added thereto at 30° C. over 2 hours. A reaction was allowed to proceed at 40° C. for 2 hours and 60° C. for 3 hours. After the reaction was over, water (200 g) was added. pH of the aqueous phase was 10 or higher. After the solution was stirred at 50° C. for 1 hour, acetic acid (0.5 g) was added to neutralize the aqueous phase to pH 7. Then, heating was effected under reduced pressure to recover the nitrobenzene, followed by cooling down to 50° C., filtration, washing and drying to obtain 4-bromo-N-acetyl-1-methylaminoanthraquinone (Br-QAM, 35.0 g, purity 90.2%). An overall yield from 1-AAQ: 88.2%.

What we claim is:

1. A process for preparing substituted aminoanthraquinone compounds represented by the formula (II)

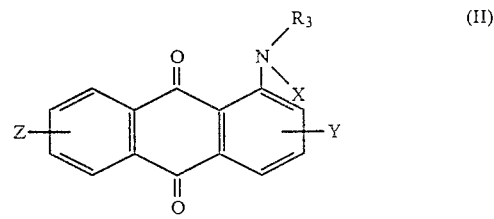

wherein $R_3$ represents a $C_1$-$C_6$ alkyl group which may be substituted, X represents a hydrogen atom, —$COR_1$ or —$SO_2R_2$ wherein $R_1$ and $R_2$ each represents a substituted or unsubstituted $C_1$-$C_4$ alkyl or $C_6$-$C_{12}$ aryl group, and Y and Z represent independently a hydrogen atom, a halogen atom, a nitro group or a $C_1$-$C_4$ alkyl group, which comprises allowing anthraquinone compounds represented by the formula (I)

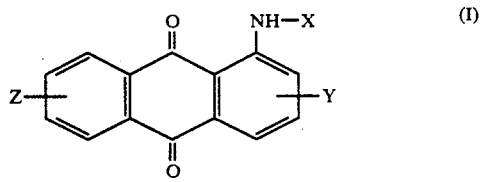
(I)

wherein X, Y and Z are as defined above, to react with alkylating agents in organic solvents in the presence of organic quaternary ammonium salts and alkalies.

2. A process according to claim 1 wherein the alkylating agents are alkyl halides, dialkylsulfuric acids or arylsulfonic acid alkyl esters.

3. A process according to claim 1 wherein the anthraquinone compound of the formula (I) is 1-aminoanthraquinone.

4. A process according to claim 1, wherein the anthraquinone of the formula (I) is 1-acetylaminoanthraquinone obtained by allowing 1-aminoanthraquinone to react with acetylating agents.

5. A process for preparing 4-bromo-substituted aminoanthraquinone compounds which comprises allowing the substituted aminoanthraquinone compounds obtained in claim 4 to react with brominating agents.

6. A process according to claim 1 wherein the anthraquinone of the formula (I) is 4-bromo-1-acetylaminoanthraquinone obtained by allowing 1-aminoanthraquinone to react with acetylating agents to obtain 1-acetylaminoanthraquinone which is further allowed to react with brominating agents.

* * * * *